Figure 1:
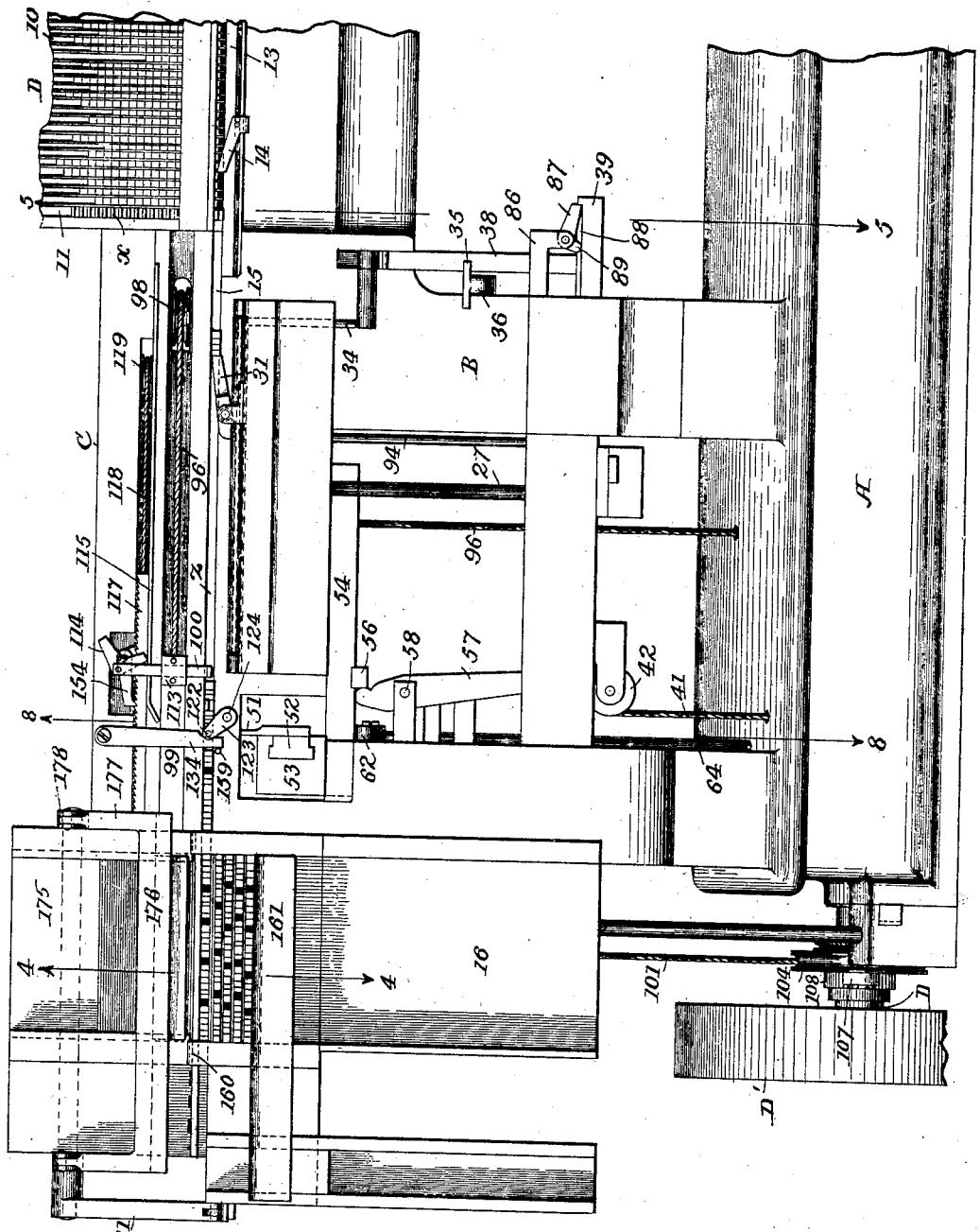

No. 826,578.  
PATENTED JULY 24, 1906.  
F. A. JOHNSON.  
TYPE SETTING AND JUSTIFYING MACHINE.  
APPLICATION FILED SEPT. 23, 1899.

7 SHEETS—SHEET 1.

Witnesses  
Inventor

No. 826,578. PATENTED JULY 24, 1906.
F. A. JOHNSON.
TYPE SETTING AND JUSTIFYING MACHINE.
APPLICATION FILED SEPT. 23, 1899.

7 SHEETS—SHEET 2.

Witnesses
J.G. Hinkel
William E. Neff

Inventor
F. A. Johnson
By J.H. Watson
Atty.

No. 826,578. PATENTED JULY 24, 1906.
F. A. JOHNSON.
TYPE SETTING AND JUSTIFYING MACHINE.
APPLICATION FILED SEPT. 23, 1899.
7 SHEETS—SHEET 3.
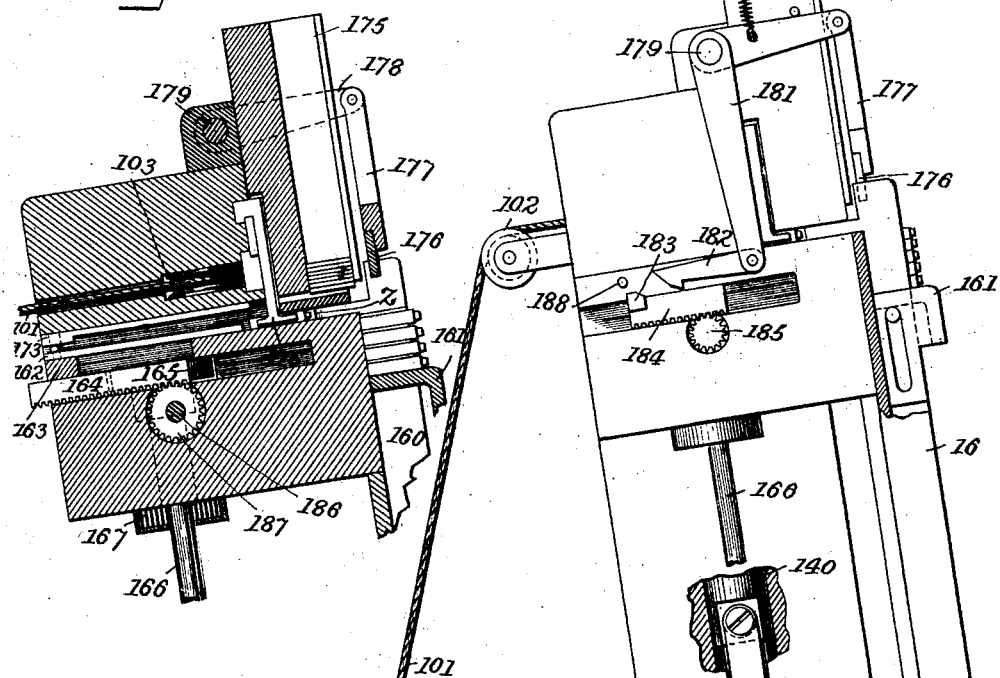
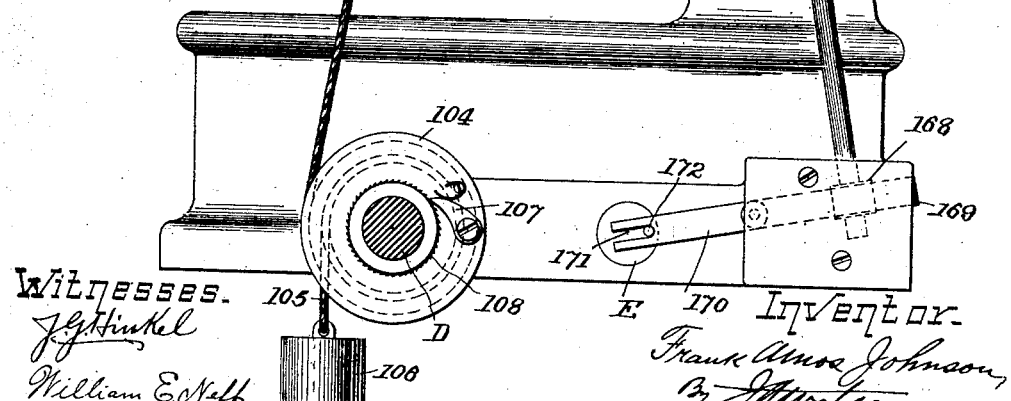

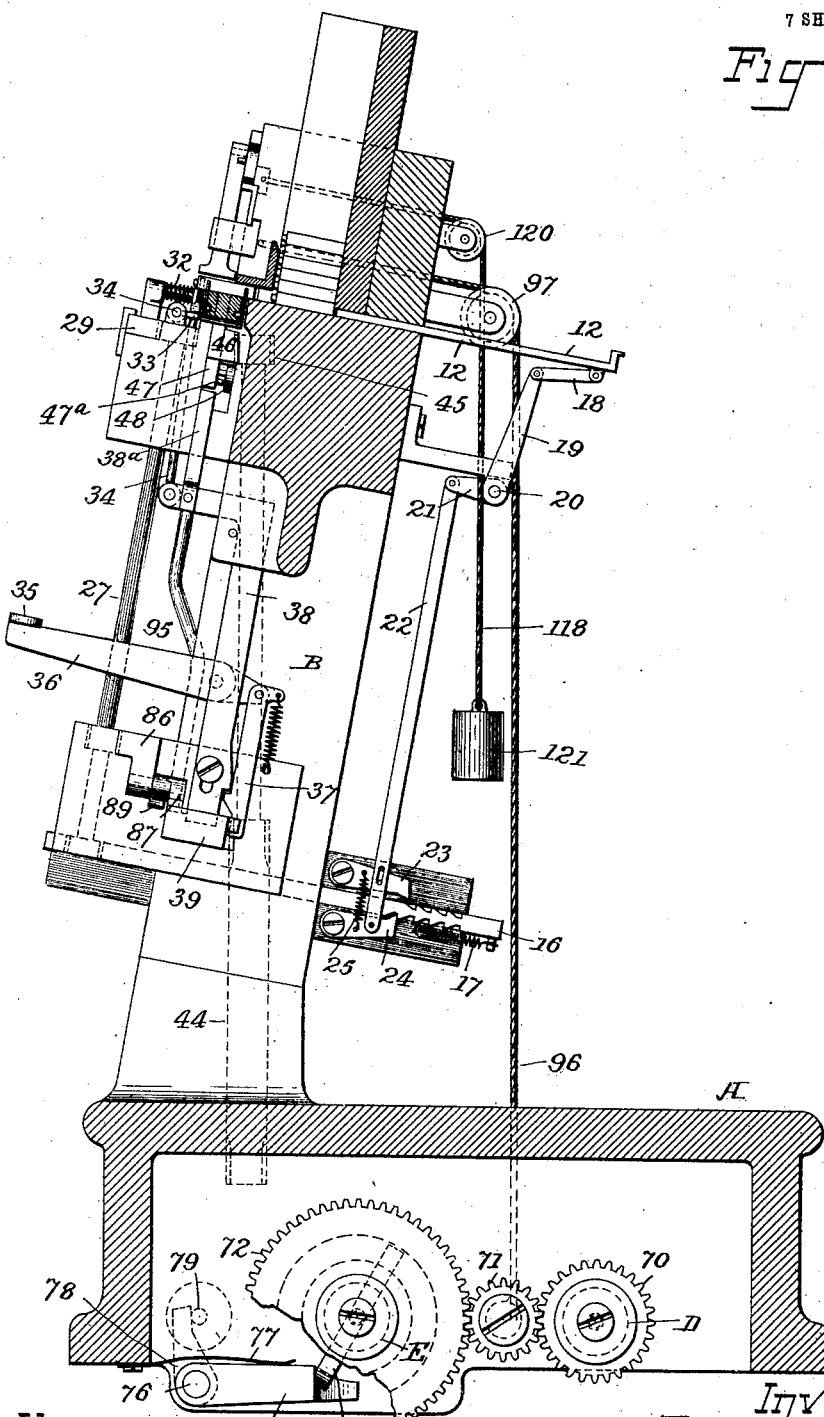

No. 826,578. PATENTED JULY 24, 1906.
F. A. JOHNSON.
TYPE SETTING AND JUSTIFYING MACHINE.
APPLICATION FILED SEPT. 23, 1899.

7 SHEETS—SHEET 5.

Witnesses.
J. G. Hinkel
William E. Neff

Inventor.
Frank Amos Johnson
By J. H. Watson
Atty.

No. 826,578. PATENTED JULY 24, 1906.
F. A. JOHNSON.
TYPE SETTING AND JUSTIFYING MACHINE.
APPLICATION FILED SEPT. 23, 1899.

7 SHEETS—SHEET 6.

Witnesses.
Arthur L. Bryant
William E. Neff

Inventor.
Frank Amos Johnson
By F. A. Watson
Atty.

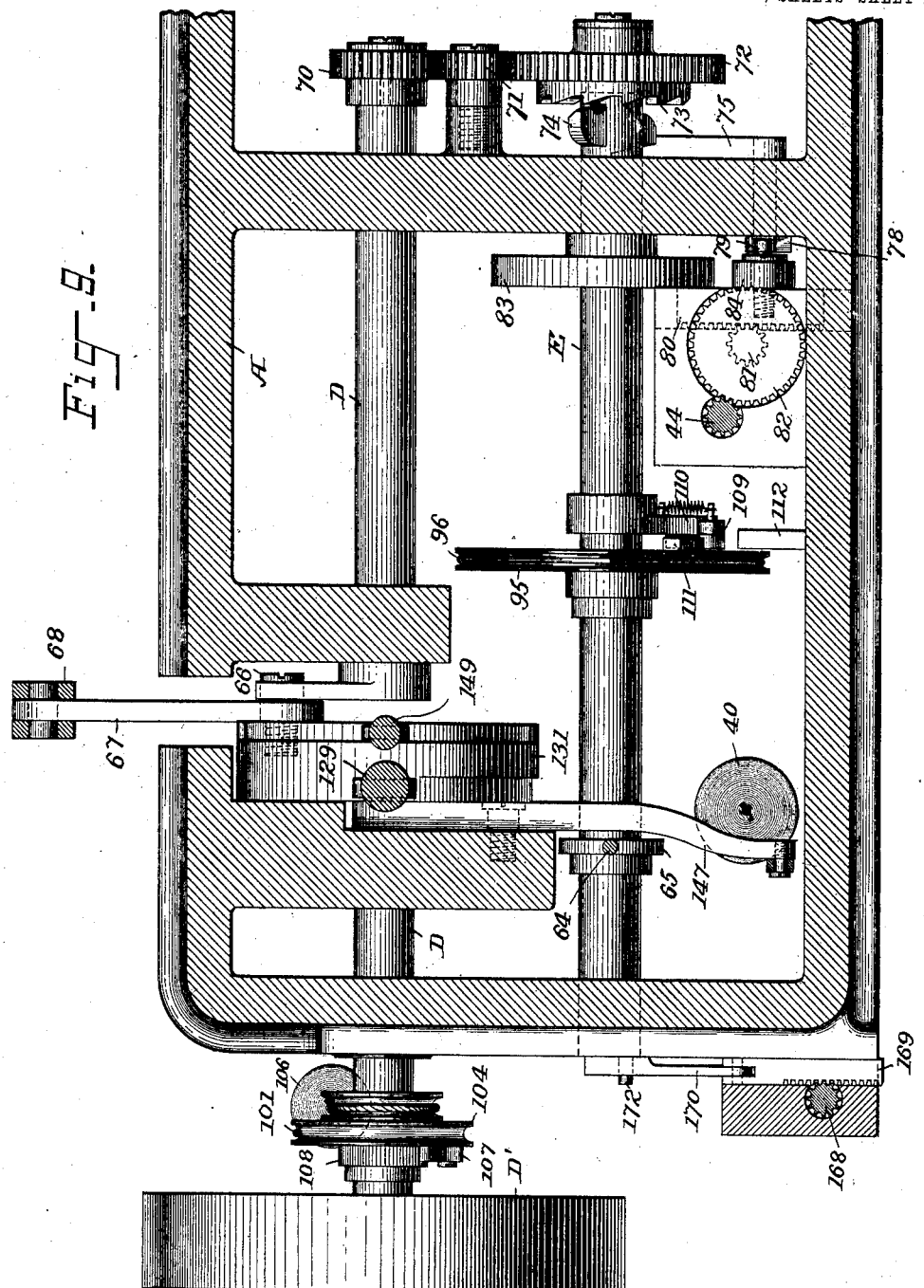

UNITED STATES PATENT OFFICE.

FRANK AMOS JOHNSON, OF NEW BEDFORD, MASSACHUSETTS, ASSIGNOR, BY MESNE ASSIGNMENTS, TO THE UNITYPE COMPANY, OF MANCHESTER, CONNECTICUT, A CORPORATION OF NEW JERSEY.

TYPE SETTING AND JUSTIFYING MACHINE.

No. 826,578.     Specification of Letters Patent.     Patented July 24, 1906.

Application filed September 23, 1899. Serial No. 731,479.

*To all whom it may concern:*

Be it known that I, FRANK AMOS JOHNSON, a citizen of the United States, residing at New Bedford, in the county of Bristol and State of Massachusetts, have invented certain new and useful Improvements in Type Setting and Justifying Machines, of which the following is a specification.

The present invention comprises a justifying mechanism which may be used in conjunction with any of the forms of type-setting machines which are adapted to assemble lines of type with temporary spaces. In the drawings I have shown this justifying mechanism as constituting the left-hand portion of a combined type setting and justifying machine somewhat similar in its general outline to the machine shown in Letters Patent No. 607,047, issued to me July 12, 1898.

In the machine described in the above-mentioned patent the lines of type are assembled with temporary spaces and pass from the type-setting machine to the justifier. In the justifier each line is measured and the spacing devices are set in accordance with the measurement of the line and the number of word-spaces in it. The justifying-spaces are cut from strips of type metal and inserted in the line in lieu of the temporary spaces, which temporary spaces are returned to the magazine of the type-setter for reuse.

In the present invention lines of type are assembled with temporary spaces of the largest size permissible in justified lines. These spaces are preferably of type-metal, although they may be of other material which is capable of being trimmed to a smaller size readily. After a line is assembled it is measured and the respacing devices are set in accordance with said measurement and the number of word-spaces in the line. The spaces are then successively ejected from the line, trimmed to proper size for justifying, and replaced in the line. As shown, the trimming is performed with a saw, while a projecting end of the space is cut off by a knife or chisel. The invention will now be particularly described in connection with the accompanying drawings, in which—

Figure 2:
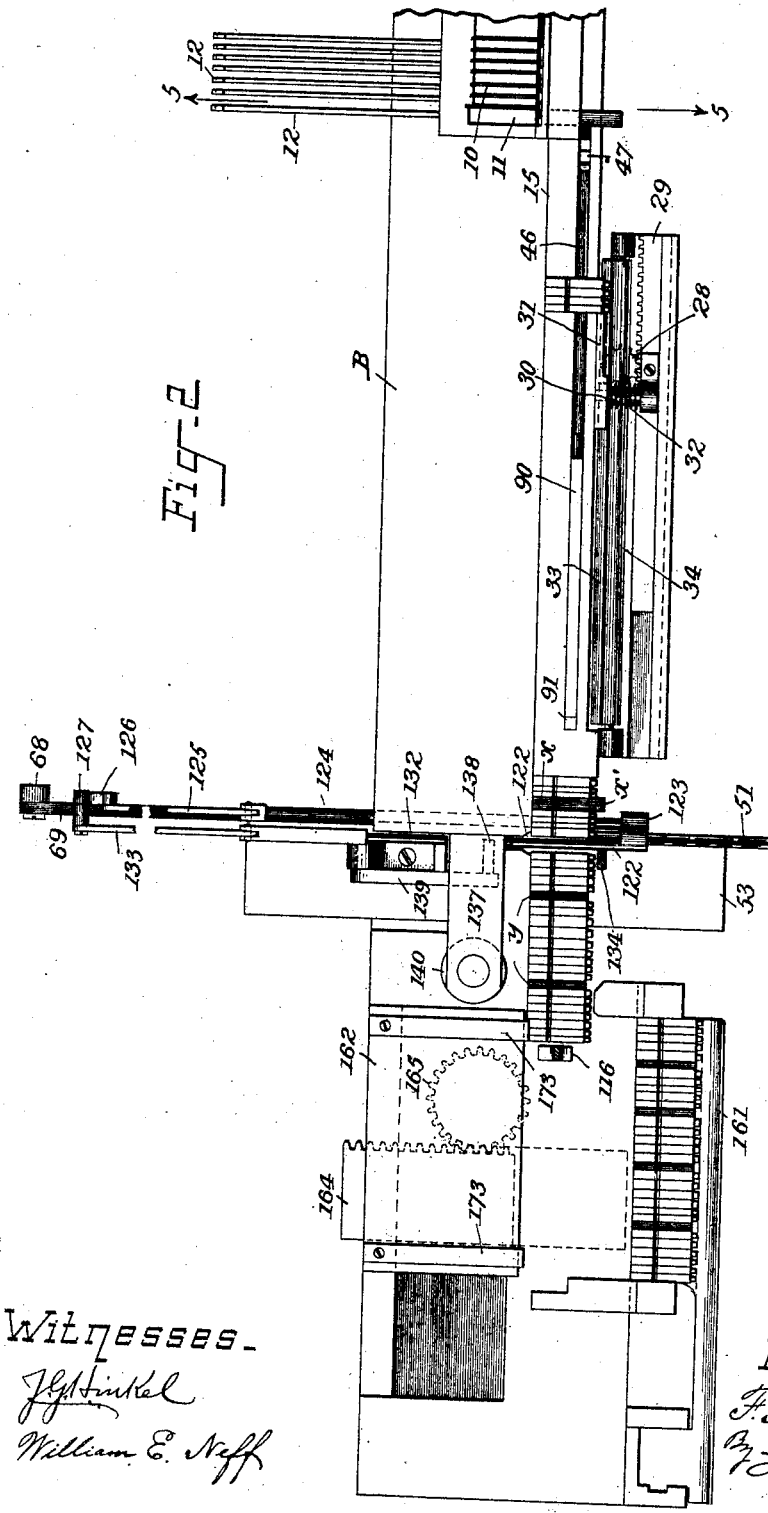
Figure 6:
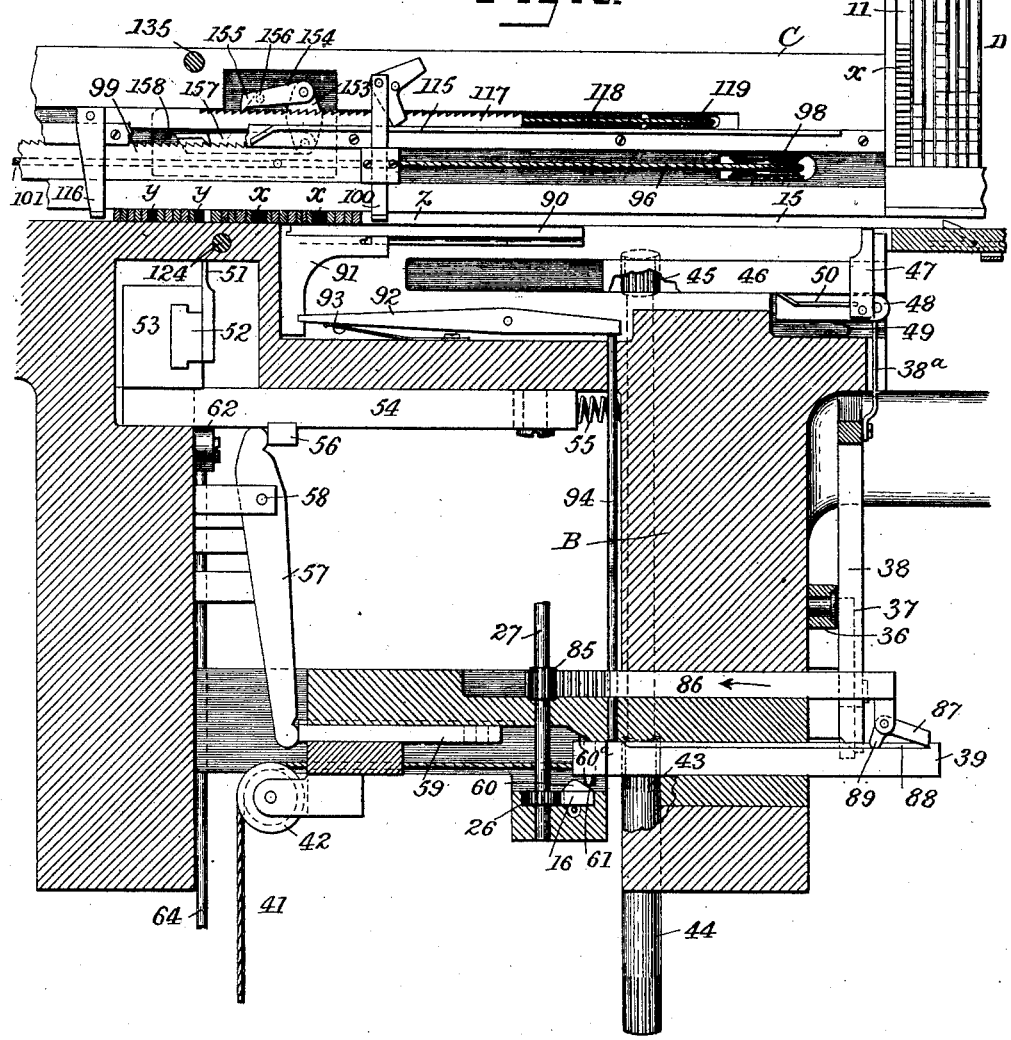
Figure 7:
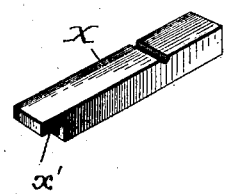
Figure 8:
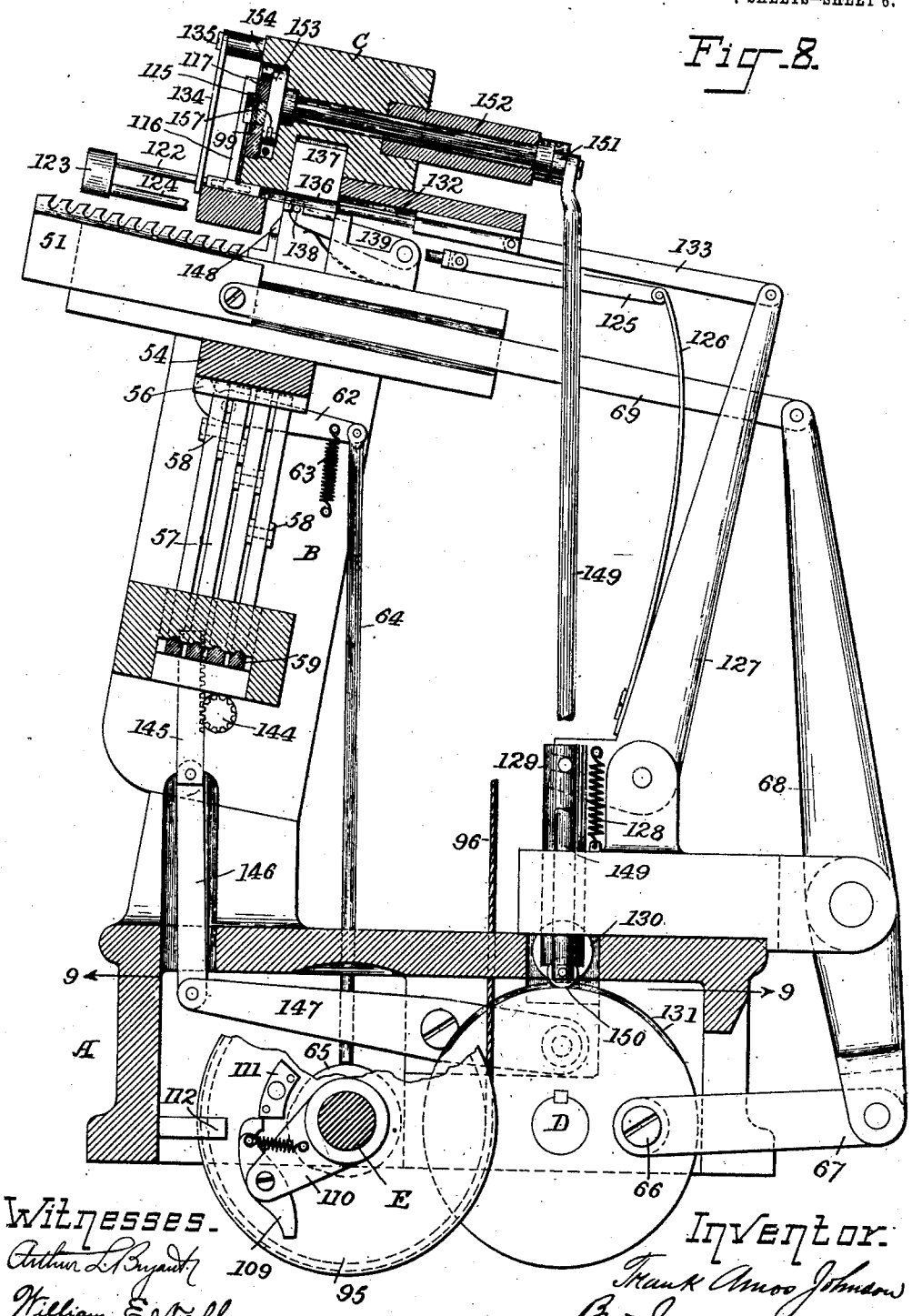

Figure 1 is a front elevation of the justifying-machine, showing also a fragment of an attached type-setting machine. Fig. 2 is a plan view with the top bracket or cap removed. Fig. 3 is a left end elevation. Fig. 4 is a section about on the line 4 4 of Fig. 1. Fig. 5 is a section on the line 5 5 of Figs. 1 and 2. Fig. 6 is a front elevation with parts broken away. Fig. 7 is a perspective view of one of the temporary spaces. Fig. 8 is a vertical section about on the line 8 8 of Fig. 1, and Fig. 9 is a sectional plan taken in part on the line 9 9 of Fig. 8.

The main frame of the machine may be of any size and shape suitable to sustain the operating parts. As shown, it comprises a base A, a main bracket B, and a cap piece or bracket C.

I have shown in several views a small portion of a type-setting machine at the right of the justifier sufficient to illustrate the manner of assembling the lines with temporary spaces. This type-setting machine is substantially the same as that illustrated in the patent above mentioned, and it need only be briefly alluded to.

Referring to Figs. 1, 2, 5, and 6, D indicates a magazine having channels 10 for type and a channel 11 for the temporary spaces. The type and spaces are ejected in their proper order by plungers 12, the type being delivered onto a rail 13 and carried along said rail by a type-shuttle 14 to the stick or place of assemblage 15. The untrimmed temporary spaces are indicated by $x$ and the trimmed or justifying spaces by $y$. Each time that a space $x$ is ejected from its magazine a word-counting rack 16 is permitted to be drawn forward one step by a spring 17. The word-counting rack is operated from the space-ejector 12 by means of link 18, arm 19, rock-shaft 20, arm 21, link 22, and escape-pawls 23 24. The pawl 24 is pivotally connected to the link, and the pawl 23 is connected by means of a pin and slot. The pawls are urged toward each other by means of a spring 25. The operation of the above devices will be obvious. The word-counting rack 16 is in mesh with a pinion 26 on an upright shaft 27, Figs. 2, 5, and 6, and on the upper end of shaft 27 is a pinion 28, in mesh with a rack 29 in front of the stick 15. The rack 29 carries a stud 30, on which is pivoted a pawl 31 adjacent to the stick. The pawl 31 serves as a stop for the type-line as it is formed in the stick, and the gearing between the slide 29, which carries the pawl, and the counting-rack 16 is so proportioned that the pawl moves backward each time a space is ejected into the line a distance equal to the difference between the thickness of one of the temporary spaces $x$ and a normal space, thus lengthening the stick to compensate for said difference. A coiled spring 32, surrounding the stud 30, tends to throw the pawl 31 up into the path of the type, Figs. 2 and 5. Beneath the pawl 31 is a rocking blade 33, mounted on a rock-shaft 34. The shaft is rocked periodically to throw up the blade and throw the pawl down out of the path of the type by a reciprocating rod $34^a$, resting on and operated by stop-bolt 38, hereinafter described, Figs. 1 and 5. When sufficient type and spaces have been assembled in the stick 15 to form a line, a starting-key 35 is depressed to bring the justifying mechanism into operation. Upon the rear end of the starting-lever 36 is a pivoted depending hook 37, which engages a shoulder on a stop-bolt 38 and raises the lower end of said bolt out of engagement with a rack 39, Figs. 5 and 6. The rack 39, which will be termed the "lower" compacting-rack, is then drawn to the left by a weight 40, attached to cord 41, passing around a sheave 42, Figs. 1, 6, and 9. The rack 39 is in mesh with a pinion 43 on a shaft 44, and the pinion 45 on the upper end of said shaft is in mesh with an upper compacting-rack 46. A compacting-head 47 is carried by said rack 46 and slides in vertical guideways thereon, Fig. 6. Before the rack 46 starts to the left the compacting-head 47 is raised by finger $38^a$ on bolt 38, the upper end of said head extending into the stick 15 and carrying the line of type contained therein over against an abutment 90. It will be evident, therefore, that the amount of movement of the compacting-racks to the left will depend upon the amount of matter in the line measured. This movement of the compacting-racks is used to adjust the mechanism for cutting down the spaces, as will be hereinafter described. The compacting-head 47 is lowered on the return movement of the rack by a rib 50 on a pivoted switch-piece 48, which is pressed upward normally by a spring 49. Said rib engages a pin $47^a$ and draws the head below the stick to permit the next line of type to be assembled therein.

A transversely-reciprocating saw 51 is connected to a block 52, which slides in a head 53, attached to a slide 54, which slide is suitably guided in the main bracket B, Figs. 6 and 8. Slide 54 is normally pressed to the left by a spring 55, and on its lower surface it is provided with a shoulder 56, against which the upper ends of a series of justifying-levers 57 bear. The justifying-levers 57 have their fulcrum-points 58 variously arranged, so that like movements of the lower ends of the levers will produce different movements of their upper ends. A series of slides 59, Figs. 6 and 8, are located opposite the lower ends of the levers. These slides are of different lengths, as indicated by dotted lines in Fig. 6, to compensate for the excess in the line due to the abnormal spaces. Upon the word-counting rack 16 is a cam 60, and in the left end of the lower compacting-rack 39 are a series of sliding pins 61. At the end of each line the cam 60 will be located in the path of a pin 61, corresponding to the number of word-spaces in the line, and as the rack 39 moves to the left the proper pin will be raised and will cause a corresponding slide 59 and justifying-lever 57 to be operated. On the return of rack 39 the elevated pin 61 is depressed by an inclined surface $60^a$. The amount of movement given to the justifying-lever will depend upon the measurement of the line, as said measurement controls the movement of the compacting-slide, and also upon the length of the selected slide 59. The number of word-spaces in the line and the length of the line are thus made the two factors which control the movement of the saw-carrying slide, and the parts are so proportioned that the saw is adjusted for each line to the proper position for cutting down the spaces of that line to the size of justifying-spaces. As soon as the saw is properly adjusted the saw-carrying slide is clamped in position by a locking-lever 62, operated by a spring 63 and a rod 64, bearing on a cam 65 on movement-shaft E.

Beneath the base-plate is a constantly-running power-shaft D, driven by a pulley D'. Shaft D is formed in two parts connected by a crank-pin 66, Fig. 9, and the saw 51 is operated from the crank-pin by means of a link 67, lever 68, and link 69, Fig. 8. On one end of shaft D is a gear 70, which drives an idle gear 71 and a gear 72 loose on the movement-shaft E, Fig. 9. The gear 72 and its attached clutch member 73 are thus constantly rotated. Pivoted in a slot in the shaft E is a pawl 74, which normally tends to coöperate with said clutch member, but is prevented from doing so by a wedge 75, which engages the rear end of the pawl and throws the forward end out of engagement with the clutch, Figs. 5 and 9. Wedge 75 is in the form of an arm of a rock-shaft 76, and the spring 77 bearing on said arm tends to throw the wedge out of engagement with the pawl. The wedge is normally held in engagement with the pawl by an arm 78 on said rock-shaft, against which bears the pin 79, carried by a rack 80. (Shown in dotted lines, Fig. 9.) The rack 80 is in gear with the compacting-shaft 44 by means of pinion 81 and gear 82, Fig. 9. It will be evident that when the starting-key is depressed and the compacting-shaft 44 rotated the wedge 75 will be thrown out of engagement with the pawl 74 and the clutch 73 engaged therewith, thereby starting the movement-shaft E. As said shaft revolves cam 83 thereon engages a roll 84 on pin 79 and throws the rack 80 forward, thus rotating the compacting-shaft 44 and restoring the compacting-slides to their initial positions and at the same time raising the wedge 75 into position to intercept the pawl 74 and stop the movement-shaft on the completion of a single revolution.

The movement of slide 39 to the left upon its release by the starting-key effects the return of the word-counting rack 16 as follows: The word-counting rack is in gear with shaft 27, as previously described. Upon this shaft is a pinion 85 in gear with a rack 86, which rack carries a pawl 87, adapted to run idly in a groove 88 in the lower compacting-slide 39 as the word-counting rack is being adjusted during the operation of assembling a line of type. As the slide 39 moves to the left one of its pins 61 is first raised by the cam 60 on the counting-rack, and the pawl 87 then encounters a shoulder at the end of groove 88, and slide 86 is thereafter carried to the left until the counting-rack reaches its initial or rearward position. At this point an arm 89 encounters an obstruction which throws the pawl 87 out of engagement with slide 39, and the word-counting rack is held in its initial position by the pawl 24.

The abutment-block 90, against which the line is measured, is carried in a vertically-movable slide 91, Fig. 6, so that it may be thrown up into the channel z to intercept the type-line and then lowered to permit the line to pass. The channel z is a continuation of the stick 15, leading from the stick to the galley. The abutment-block 90 is detachable from the slide 91, so that blocks of different lengths may be substituted to provide for measuring lines of different column measure. The slide 91 tends to rise under the influence of a lever 92 and underlying spring 93. It is normally held down, however, by a rod 94, Fig. 6, which rests on the lower compacting-slide 39. As soon as said slide begins to move forward the rod 94 drops into groove 88 and permits the abutment-block to rise in time to intercept the line of type. It will be understood that the stick-pawl has previously been withdrawn from the channel 15 to permit the line to pass to the abutment-block.

On the movement-shaft E is a loose sheave 95, to which is attached one end of a cord 96. Cord 96 passes about pulleys 97 98, Figs. 5, 6, and 8, and is connected to a follower-rack 99, which carries a vertically-movable follower 100. To the follower-rack 99 is also connected a cord 101, which passes around sheaves 102 103 and is connected to a sheave 104, which is loose upon the power-shaft D, Figs. 1, 3, and 4. Connected to pulley 104 is a second cord 105, carrying a weight 106. The pulley also carries the spring-pressed pawl 107, which engages a ratchet-wheel 108, fast on the shaft. The weight 106 tends to turn the pulley 104 in the direction in which the shaft moves, and the pawl and ratchet 107 108 prevent the pulley from rotating faster than the shaft, and thereby control the movement of cord 101 and its attached follower-head.

As the movement-shaft revolves, consequent upon the operation of the starting-key, a pawl 109, carried by an arm 110, which is fast on said shaft, engages a block 111 on pulley 95, Fig. 8. Just before the movement-shaft completes its revolution the tail end of pawl 109 encounters a fixed piece 112 and the pawl is disengaged from the pulley 95, releasing the same and permitting it to be drawn backward by the cord 96. This single rotation of pulley 95 draws the follower-slide back to permit the follower to engage the line of type under justification and raises the follower-propelling weight 106. During the rearward movement of the follower rack or slide the follower-head 100, which slides in a guide 113 on the rack 99, is kept in an elevated position by a gravity-pawl 114, which slides on a rail 115, the head 100 being pivotally connected to said pawl. As soon as the rack 99 starts to move to the left the head 100 is dropped into the channel z by the gravity-pawl 114, and it engages the rear end of the line and moves the same forward until it is intercepted in a manner hereinafter described.

The line of type during its forward movements is clamped between the follower 100 and a "preceder" 116, Fig. 6. The preceder 116 is connected to a sliding rack 117, which is normally drawn to the right by a cord 118, passing over sheaves 119 and 120 and having at its extremity a weight 121, Figs. 5 and 6, the said weight being comparatively light and adapted to be overpowered by the weight impelling the follower. Under the combined influence of the follower and the preceder the line, in a clamped position, tends to move to the left toward the galley. The temporary spaces x are formed with extensions x', which project forward beyond the type. As the line moves to the left these projections stop it with the several spaces successively opposite the saw and the spaces are removed, trimmed, and returned to the line by mechanism which will now be described. Opposite a point in the channel z above the saw is a constantly-reciprocating ejecting-plunger 122, Figs. 2 and 8. This plunger is carried by a head 123 on slide 124, connected by link 125 to a spring-arm 126, carried on elbow-lever 127. Arm 126 is thrown forward by a spring 128 and backward by a slide 129, which has a roll 130 resting on cam 131 on the power-shaft D, the slide 129 being suitably jointed to the lever 127. To the lever 127 is also connected a space-injecting plunger 132 by means of a link 133. Plunger 122 removes the space from the line, and the plunger 132 replaces it in the line after it has been trimmed. The ejecting-plunger 122 at each revolution of shaft D tends to enter the channel z, but is prevented normally by a shutter 134. When a temporary space arrives in line with the ejecting-plunger, however, the shutter 134, which is pivoted at 135, is moved to the left by projection $x'$ and the plunger enters the channel, carrying the space rearward into a suitable groove or holder 136 in an elevator 137. The space is clamped in the elevator by a pin 138 on a spring-pressed lever 139, Figs. 2 and 8. The elevator is operated by a vertically-reciprocating rod 140, Figs. 2, 3, and 8, link 141, crank 142, rock-shaft 143, pinion 144, rack 145, link 146, and cam-lever 147, the latter having a roll which runs in a groove in the face of cam 131, Fig. 9.

The operation of the space-cutting devices is as follows: The temporary space pushes aside the shutter 134. The ejecting-plunger then pushes the space into the elevator, where it is clamped by the pin 138. The elevator then descends, carrying the space to the saw. The rearward movement of the saw then trims off the proper amount from the space, and the elevator carries the space back in line with the channel z. The injecting-plunger 132 then returns the space to the channel. During the downward movement of the elevator the projection $x'$ of the space is trimmed off by a knife 148, Fig. 8. During the operation of removing and replacing the space the line must be released from the pressure of the preceder and follower heads, and this is accomplished in the following manner: Referring to Figs. 6 and 8, 149 indicates a vertically-reciprocating rod which is operated by a roll 150, resting on a portion of cam 131. Rod 149 is connected to an arm 151 on a rock-shaft 152, and on the forward end of said rock-shaft is a double lever 153. The upper end of said lever carries a pawl 154, which engages the preceder-rack 117 when it is moved to the left. When it is moved to the right, an incline 155 on the pawl engages a fixed pin 156 and the pawl is raised from the rack, permitting the latter to move freely in either direction. To the lower end of the lever 153 is connected a pawl 157, which engages the follower-rack 99 when moved to the right. When said pawl is moved to the left, its inclined end engages a pin 158, which lifts the pawl from the rack, permitting the rack to move freely in either direction. It will be obvious that at each revolution of the power-shaft D the pawls 154 157 engage the racks and move the follower and preceder heads apart, thus relieving the line of all pressure, as shown in Fig. 6. The pressure on the line is thus relieved during the time the space is being removed, trimmed, and replaced. As soon as the space is replaced in the line the pawls are withdrawn from the racks, and the line is permitted to move forward under the influence of the follower-head until the next space is intercepted by the shutter. The movement of the shutter is limited by a fixed pin 159, Fig. 1, which stops the space in proper position opposite the ejecting-plunger. After the last space $x$ has been transformed into a justifying-space $y$ the line moves to the left under the influence of the follower 100 until it registers with the galley 160, Figs. 1, 2, 3, and 4. The galley is provided with the sliding support 161, which is moved down each time a line is transferred to it, the topmost line or lead remaining flush with the bottom of channel z ready to receive the succeeding line. The lines are ejected from the channel z to the galley by a blade 162, carried by a cross-bar 163 on a rack 164. The said rack is reciprocated by a pinion 165, Figs. 2 and 4, on a shaft 166. A spring 167, connected to said shaft, tends to throw the blade 162 forward when said spring is under tension. The spring is placed under tension each time the movement-shaft is rotated by means of a pinion 168, rack 169, and connecting-rod 170, the said connecting-rod having a slot 171, which engages with a crank-pin 172 on the end of the movement-shaft E, Figs. 4 and 9. Above the ejecting-blade and connected thereto are two blades 173, Figs. 2 and 4, adapted to enter the bottom of a lead-magazine 175 and eject the lowermost lead onto a line of type as the latter is being transferred. Above the galley is a depressing-bar 176, carried by yoke 177, which is connected to arms 178 of a rock-shaft 179, Figs. 1 and 3. The depressing-bar 176 is normally held in a raised position by a spring 180, and it is periodically depressed by means of an arm 181 and a hook 182, the latter engaging with a projection 183 on a sliding rack 184. The rack is reciprocated by a pinion 185, which is driven by a rock-shaft 186 and pinion 187 in mesh with teeth on the lower side of rack 164, Figs. 3 and 4. When the line-transfer blade 162 is moved forward, the shoulder 183 travels forward under the hook 182. If for any reason the line is not fully transferred to the magazine, the hook 182 will not engage the shoulder 183 and the depressing-bar will not be operated. When the line is fully transferred to the magazine, the hook drops over the shoulder 183, and on the return movement of rack 184 the depressing-bar 176 moves down and carries the last line into the galley sufficiently to permit the next line to be transferred. At this point the beveled end of the hook 182 rides over a pin 188, which releases the hook and permits spring 180 to raise the depressing-bar 176.

From the above detail description and the accompanying drawings the operation of the justifier will be readily understood. The various movements, briefly recapitulated, are as follows: The type and temporary spaces $x$ are assembled in the stick 15 by any suitable type-setting machine. When a sufficient amount of matter has been assembled to constitute a line, the starting-lever is operated and the lower compacting-rack 39 released by raising the stop-bolt 38. Simultaneously the finger $38^a$ throws up the compacting-head 47 and the rod 34 rocks blade 33 and lowers stick-pawl 31. The released compacting-rack 39 is drawn to the left by weight 40, and simultaneously the compacting-head 47 is drawn to the left, carrying the line with it through channel $z$, against the abutment 90, which abutment is raised into the channel immediately after the lower compacting-rack 39 starts. The line is therefore compressed and measured between the head 47 and the abutment 90, and the movement of slide 39 is limited by such measurement. The counting-rack, which was located while the line was being set up, presents the cam 60 in the path of one of the pins 61 and raises said pin into position to engage a slide 59 to operate the proper justifying-lever and set the saw-carrying slide to trim the spaces for the line properly. The saw-carrying slide is immediately clamped by the lever 62, and it remains clamped until the line is justified and the starting-key operated for the succeeding line. As soon as the saw is adjusted the measuring devices are returned to their initial positions by the cam 83, which rotates the shaft 44 backward, said cam being on the movement-shaft, which makes one complete revolution each time the starting-key is depressed. During the return movement of the compacting-slide 46 the head 47 is drawn down by the rib 50. The stick-pawl 31 rises immediately after the starting-key is released. The operation of setting type for the next line may be begun immediately and continued while the mechanism is automatically justifying the preceding line. During the rotation of the movement-shaft the follower-rack is brought to the right and released, and as it starts to the left under the influence of its weight the follower-head 100 enters channel $z$ behind the line of type. The preceder-head is always in advance of the line of type, and the line is clamped between said heads and moved to the left until the first temporary space $x$ engages the shutter 134. The injecting and ejecting plungers and the elevator are continuously operated by the power-shaft, and at each revolution of said shaft one of the spaces is removed from the line, trimmed, and replaced. The line-releasing devices are also continuously operated, and the line is unclamped once during each revolution of the power-shaft to permit the removal of a space. After the last space is trimmed the line moves to the galley.

During the next rotation of the movement-shaft the line is transferred to the galley and depressed out of the way of the succeeding line.

The machine herein described constitutes one means of manufacturing justifying-spaces. The broad idea of manufacturing justifying-spaces is disclosed in my prior patent above mentioned and is also described and claimed in Letters Patent No. 608,997, granted August 9, 1898, to the Johnson Typesetter Company. I believe the invention herein described is the first mechanism constructed and arranged to justify a line of type assembled with temporary spaces by removing portions of those spaces to reduce them to proper size for justifying.

Without limiting myself to the particular construction and arrangement of devices illustrated and described, I claim—

1. A mechanism for justifying lines of type composed with single temporary spaces of maximum width, comprising means for successively reducing said single spaces to the proper width to justify the line.

2. A mechanism for justifying lines of type composed with temporary spaces of maximum width, comprising means for trimming portions from said temporary spaces to form justifying-spaces.

3. A mechanism for justifying lines of type composed with temporary spaces of maximum width, comprising means for removing said spaces from the lines successively, means for reducing said spaces in size to form justifying-spaces, and means for replacing said justifying-spaces in the line.

4. A mechanism for justifying lines of type composed with temporary spaces of maximum width, comprising means for removing said spaces from a line, means for trimming said spaces to form justifying-spaces, and means for replacing the justifying-spaces in the line.

5. A mechanism for justifying lines of type composed with temporary spaces of maximum width, comprising means for clamping the line and moving it forward intermittently, means for stopping and unclamping the line and removing therefrom a temporary space, means for trimming said space and returning the resulting justifying-space to the line.

6. A mechanism for justifying lines of type composed with temporary spaces of maximum width, comprising a saw, means for removing the temporary spaces successively from the line and presenting them to the saw to be trimmed, and means for returning the resulting justifying-spaces to the line.

7. A mechanism for justifying lines of type composed with temporary spaces having portions projecting beyond the type, comprising means for removing said spaces from the line, means for trimming the spaces to reduce their width, means for trimming the projecting portions from the spaces, and means for returning the trimmed spaces to the line.

8. In a mechanism for justifying composed lines of type, an adjustable device for cutting justifying-spaces, means for measuring the line and determining the number of spaces in the line, and means for adjusting said device governed by the measurement of the line and the number of spaces.

9. In a justifying mechanism, the combination of a movable space-cutting device, an adjustable slide upon which said device is mounted, and means for adjusting and locking said slide in position to cut justifying-spaces for any given line.

10. In a mechanism for justifying lines of type composed with temporary spaces of maximum width, the combination of a series of justifying-levers, a common part, such as the rack 39, for operating said levers, and connections of different lengths interposed between said part and said levers to compensate for the abnormal width of the temporary spaces.

11. In a justifying mechanism, the combination with a type way or channel, of a follower-head, and a preceder-head adapted to clamp the line and move it along the channel while so clamped, with means for separating said heads to release the line at intervals.

12. In a justifying-machine, the combination with the follower-rack, the preceder-rack, the weights connected to said racks and arranged to draw them in opposite directions, and the pawls and operating devices therefor arranged to simultaneously move said racks in opposite directions and in opposition to their weights, for the purpose set forth.

13. In a type-justifying machine, the combination with a typeway, and a follower-head, of a weight for moving said follower-head, and means for controlling the descent of the weight whereby it is made to fall at a uniform speed.

14. In a justifying mechanism, the combination with a horizontal typeway, of a compacting-slide movable parallel therewith, a compacting-head movable vertically on said slide, means for raising said head and moving the slide to engage a line of type, and means for returning the slide and head to their initial positions in readiness to engage a succeeding line.

15. In a justifying mechanism, the combination with a channel or stick in which type are assembled, of a stick-pawl mounted on a movable support and normally entering said stick to form a stop for the type therein, means for moving said pawl to lengthen the stick each time a space is inserted, and means for throwing said pawl out of the stick to permit the line to pass to the respacing mechanism.

16. In a justifying mechanism, the combination with a channel or stick, of a stick-pawl movable into and out of said channel and forming a stop for the type therein, a slide upon which said pawl is pivotally mounted, and a rocking blade adjacent to the path of said pawl and adapted to withdraw it from the stick at any point in its travel.

17. In a type setting and justifying machine, the combination with a channel or stick for the assemblage of lines, and a movable stick-pawl forming a stop for the type in said channel, of a space-ejector, a space-counting rack operated thereby, and connections between said rack and the stick-pawl for moving the latter to increase the length of the stick each time a space is added to the line, for the purpose set forth.

18. In a justifying mechanism, the combination with the justifying-levers, of a space-counting rack provided with a cam 60, the slide 39 provided with movable parts 61 adapted to coöperate with said cam, and the interponent parts 59, for the purpose set forth.

19. In a justifying mechanism, the combination with a typeway, a shutter, and means for moving a line of type intermittently along said way, of a plunger for removing spaces from the line, and a second plunger for replacing said spaces in the line, said plungers being constantly reciprocating and said shutter being normally in the path of the first-named plunger, and means for moving the shutter out of said path each time a word-space arrives in said path, for the purpose described.

20. In a justifying mechanism, the combination with a typeway, and means for moving a line of type intermittently thereon, of an elevator adjacent to the typeway and adapted to receive and hold a space, a plunger for driving a space from the typeway into said elevator, means for reducing the size of the space to form a justifying-space while it is contained in said elevator, and means for retransferring said justifying-space from the elevator into the line on the typeway.

21. In a justifying mechanism, the combination with an elevator, and means for reciprocating the same, of a receptacle for a space on said elevator, a spring-pressed clamp adapted to hold said space in said receptacle during the movement of the elevator, and means for trimming the space while it is so held to form a justifying-space, for the purpose set forth.

22. In combination with justifying mechansim, means for transferring a justified line of type to a galley, comprising a transferring-blade for moving a line to the galley, a depressing-blade for moving said line into the galley and out of the way of the succeeding line, and means for interlocking said transferring and depressing blades to operate the latter, said means being so arranged that the depressing-blade will not be operated unless the transferring-blade is operated to the full end of its stroke to carry the line fully into the galley.

23. A mechanism for justifying lines of type composed with temporary spaces of maximum width and of greater length than the type, comprising means for successively reducing said spaces to the proper width to justify the line and also reducing said spaces to the length of the type in the line.

24. A mechanism for justifying a line of type composed with single temporary spaces of maximum width, comprising means for successively reducing said single spaces in width to form permanent justifying-spaces for the line.

25. A mechanism for justifying lines of type composed with temporary spaces, comprising means for removing said spaces from the line, means for reducing said spaces in size to form justifying-spaces, and means for replacing said justifying-spaces in the line.

26. A mechanism for justifying lines of type composed with single temporary spaces, comprising means for determining the width of justifying-spaces, and means for reducing said single temporary spaces to the proper width to form the justifying-spaces.

In testimony whereof I affix my signature in presence of two witnesses.

FRANK AMOS JOHNSON.

Witnesses:
J. S. BRAND,
WM. F. CASWELL.